H. Roney,
Sod Plow.
No. 113,098. Patented Mar. 28, 1871.

Witnesses.
A. L. Peck.
E. S. Peck.

Inventor:
Hamilton Roney
By his atty. H. P. K. Peck.

UNITED STATES PATENT OFFICE.

HAMILTON RONEY, OF DAYTON, OHIO.

IMPROVEMENT IN PLOWS.

Specification forming part of Letters Patent No. 113,098, dated March 28, 1871.

*To all whom it may concern:*

Be it known that I, HAMILTON RONEY, of Dayton, in Montgomery county, in the State of Ohio, have invented a new and useful Improvement in Plows; and I do hereby declare that the following is a full and exact description thereof, reference being had to the accompanying drawings, and to the letters of reference marked thereon.

Figure 1:
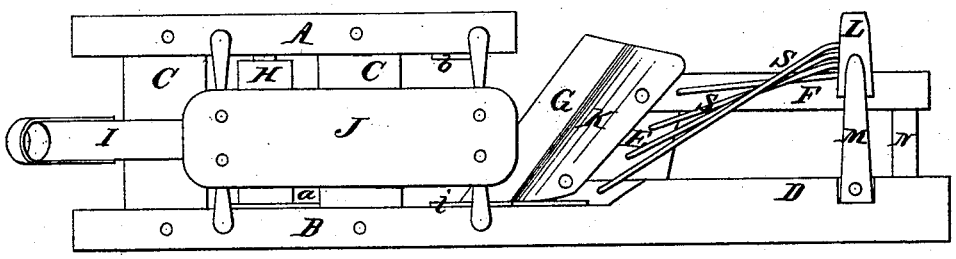
Figure 4:
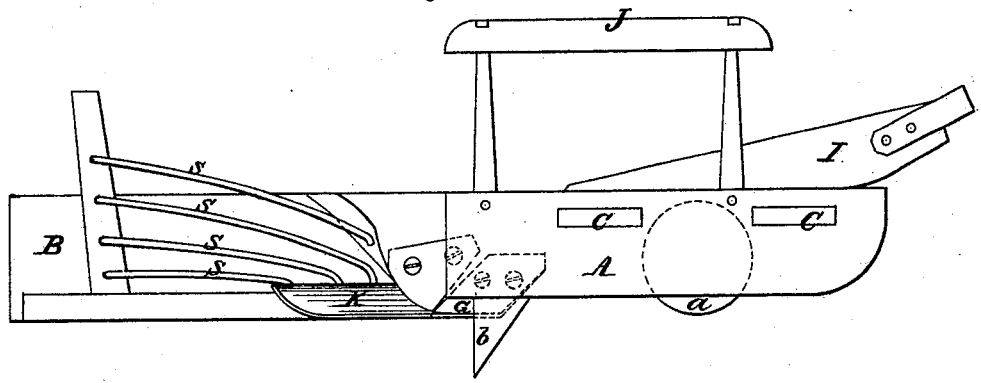
Figure 2:
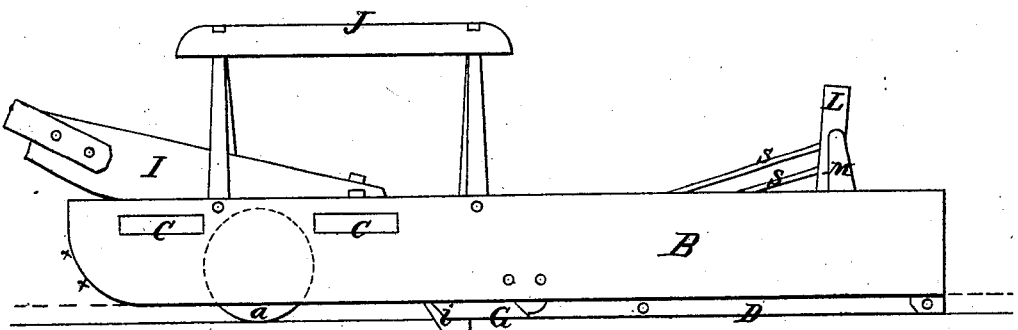
Figure 3:
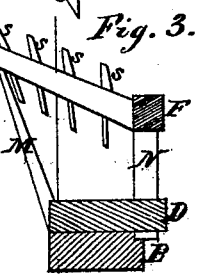

Figure 1 represents a plan or top view of my improved prairie-sod plow. Fig. 2 represents a side elevation of the same. Fig. 3 represents a view of the rear end of the same.

The object of my invention is to furnish a plow especially adapted for turning over prairie-sod; and it consists in the combination of two frames with a roller, cutters, driver's seat, mold-board, share, and draft-beam, constructed, arranged, and operating as hereinafter more fully set forth.

In the accompanying drawings, the letters A B C denote the main frame of the plow, and D E F the auxiliary frame, which is in the rear of share G. The roller H is journaled between the two sides A B of the frame, and is provided at the land side of the plow with a circular cutter, *a*, which is of larger diameter than roller H, which is so journaled as to hold the frame about one inch above the surface of the ground.

I denotes the draft-beam, bolted to the cross-pieces C C; and J is the driver's seat, fixed upon the frame, as represented in the drawings. The angular cutter *b* is fastened upon the inner side of the frame-piece A, and is of proper length to cut the sod below the depth to which the share G works. The share G and mold-board K are so fastened together as to form a groove, into which the sharp angular front edge of the block E of the auxiliary frame fits, and upon this block the share and mold-board are secured. The inner end, *i*, of share G is bent up at right angles to the horizontal portion of it, and is fastened by screws to the inside of frame-piece B; and this rising or upright part of the share has a sharp front edge, to follow the circular cutter *a*.

As an extension of the mold-board K, curved rods *s* are connected with the block E and extend back to the inclined post L, through which the ends of the rods are inserted, as seen in Fig. 3. The post L is framed into the frame-piece F, and the inclined brace M and tie N strengthen and support the rear end of the auxiliary frame. The front end of the main frame is formed like a sled, as seen at *x x* in Fig. 2, to prevent gathering trash, &c., when the plow is in use. The auxiliary frame is secured to the frame-piece B by suitable screws or bolts; and it, together with the share, extends below the main frame, as indicated in Figs. 2 and 3. In the full-sized working-plow the roller H would support the main frame about an inch above the sod upon which it travels; and the share and auxiliary frame should be fastened to the main frame, so that their lower surfaces will be two and a half inches below the roller H. This would cause the plow to turn a furrow of about two and a half inches in thickness. The angle which I find most advantageous for the plowshare is at forty-five degrees to the line of draft. The lower edge and surface of the share is about one-fourth of an inch below the lower surface of the auxiliary frame, for the purpose of preventing too great friction of the latter upon the earth; and the seat of the driver is so arranged that the weight of the driver may be changed in respect to the roller H, whereby the plow may be relieved from too great friction or dragging on the ground, and that the driver may, when necessary, cause the share to retain its full depth of furrow by moving rearward upon his seat.

The share and auxiliary frame may be connected to the main frame by adjusting screws or bolts passing through slotted holes for the purpose of adjusting the share to any desired depth of furrow.

The plow may be used to turn one furrow or strip of sod upon an unplowed narrower strip, which will cause both to decay. The advanced cutters *a* and *b* are provided to enable this kind of work, known as "cutting and covering," to be perfectly performed. When this kind of work is done, a suitable adjusting doubletree will be used to allow the off horse to walk in the adjacent furrow. The power of the team is applied so as to cause the draft to be in line with the point of resistance—namely, the edge of the share. I am aware that various agricultural machines have been provided with seats for the attendant or driver; also, that rods of iron have been used as an extension of the mold-board of plows. I do not claim these, nor, severally, any other familiar parts employed in the construction of my improved plow.

Having fully described my invention, what I claim as new, and desire to secure by Letters Patent, is—

In a sod-plow, the arrangement of the frame A B C and auxiliary frame D E F in relation to each other and to the roller H, cutters $a$ $b$, seat J, beam I, share G, and rods $s$, substantially as described.

In testimony whereof I have hereunto set my hand this 20th day of August, A. D. 1870.

HAMILTON RONEY.

Witnesses:
 H. P. K. PECK,
 THOMAS DARLEY.